R. T. NEWTON.
STEERING WHEEL.
APPLICATION FILED APR. 11, 1917.
1,276,797. Patented Aug. 27, 1918.
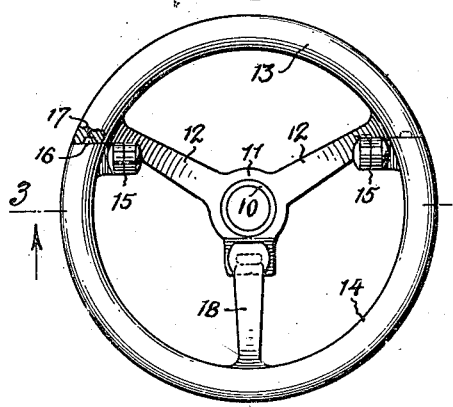
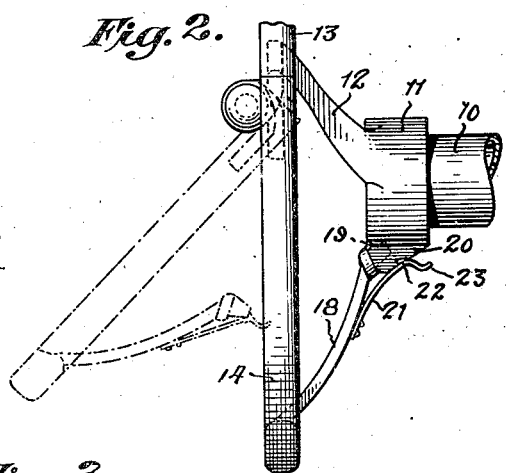
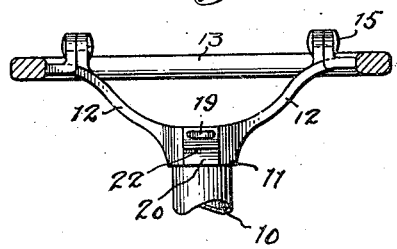
Inventor:
Richard T. Newton
by Thomson and Thomson Attys.

UNITED STATES PATENT OFFICE.

RICHARD T. NEWTON, OF NEW YORK, N.Y.

STEERING-WHEEL.

1,276,797. Specification of Letters Patent. Patented Aug. 27, 1918.

Application filed April 11, 1917. Serial No. 161,599.

*To all whom it may concern:*

Be it known that I, RICHARD T. NEWTON, a citizen of the United States of America, and residing in the city, county, and State of New York, have invented a certain new and useful Improvement in Steering-Wheels, of which the following is a specification.

My invention relates to steering wheels and particularly to steering wheels of the type commonly employed on automobiles, motor boats, aeroplanes, etc., the object of my invention being to provide a wheel of novel construction which facilitates entry or exit of the driver to or from his seat adjacent the steering wheel.

In the accompanying drawings,

Figure 1 is a broken plan of a steering wheel in which my invention is embodied in one form;
Fig. 2 is a side elevation thereof;

Fig. 3 is a section on the line 3—3, Fig. 1;

It is customary to so place the driver's seat with relation to the steering wheel of an automobile, motor boat, aeroplane, etc., that the driver's hands rest easily thereon and for this purpose it is necessary that the wheel be quite close to the driver's seat—so close in fact that getting into or out of the seat is a rather awkward matter. It has already been proposed to pivot the steering wheel, as a whole, upon the steering post so that it may swing down somewhat out of the way. It has also been proposed to mount the wheel upon a bracket so that it is slidable somewhat out of the way. Both constructions, however, are objectionable, either because of rattling through vibration, which causes excessive wear, or where the wheel is swung down, the knees of the driver are still in the way so that it is necessary to force by the wheel, or else straddle the wheel, and move from position by an awkward sidewise motion. The present construction avoids both of the difficulties mentioned so far as it is possible to do so, by leaving open all of the available space between the steering post and the seat for the driver to move into or out of position.

In the construction illustrated the steering wheel is shown mounted upon the usual post 10 by means of a collar 11 integral with the spider arms 12 which extend from the collar 11 to the portion 13 of the hand wheel. The latter is divided and comprises a second section 14 hinged at 15 to the spider arms 12 and provided with dowels 16 taking into recesses 17 in the fixed portion 13 of the wheel to accurately position the part 14 with relation thereto. The swinging section 14 carries a third spider arm 18 having a stud 19 adapted to take into a recess in the boss 20 formed on the collar 11 when the rim portion 14 is in normal position, thus affording a rigid engagement with the collar and positioning the two sections 13 and 14 in register in the same plane. The arm 18 carries a spring latch 21 which engages a recess 22 in the boss 20 and holds the section 14 in position during the operation of the car. When the driver enters or leaves his seat it is only necessary to free the latch 21 by lifting its free end 23 away from the boss 20 whereupon the section 14 of the hand wheel may be swung back on the hinges 15 in the direction indicated by dotted lines, Fig. 2, leaving the entire space between the post 10 and driver's seat free and clear. When the section 14 is returned to normal position, the stud 19 automatically enters its recess in the boss 20 and the latch 21 automatically snaps into engagement with the boss 20 on the collar 11.

It will be recognized that the swinging section of the wheel lifts upward out of the way of the knees of the driver and swings back over the fixed portion, leaving available all of the space between the fixed steering post 10 and the seat for the driver to get into or out of position. It is easier to swing the hinged portion of the wheel up and out than it is to either swing it down between the knees of the driver or slide it forward on a bracket. There is no part free to rattle and the hinged joint and latch may be readily made with such accuracy that there is no vibration between the parts of the wheel. The construction is relatively inexpensive and does not in any way lessen the security and rigidly of the steering wheel in position.

Various modifications of the folding arrangements for the wheel to accomplish a like result will readily occur to those skilled in the art without departing from what I claim as my invention.

I claim:

A steering wheel having a hub adapted to fit upon a steering post, a spider uniting said hub to the wheel rim, portion of said spider being rigid with the hub and another portion making joint therewith when the wheel is in normal position but being freely detachable therefrom, a hinge connection between the fixed spider element and the wheel rim member supported by the movable spider element, and latching means for holding said movable spider element in fixed position when engaged with the hub.

In testimony whereof I have signed my name to this specification.

RICHARD T. NEWTON.